C. GLIDDEN.
Hot Blast Oven.
No. 46,559. Patented Feb. 28, 1865.
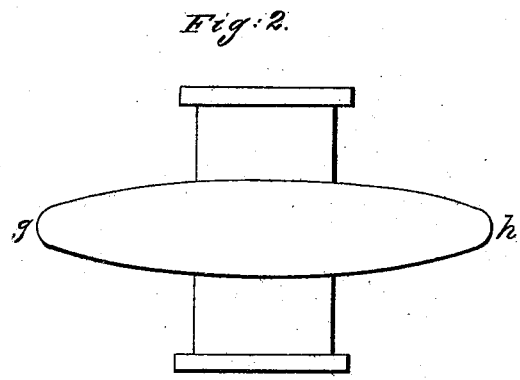
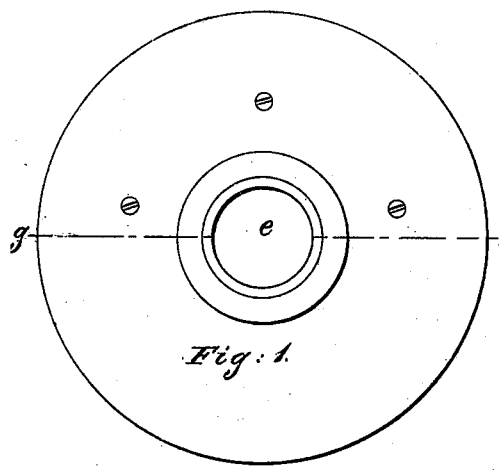
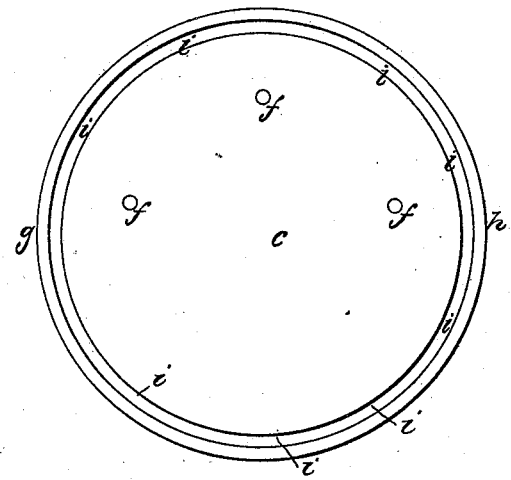
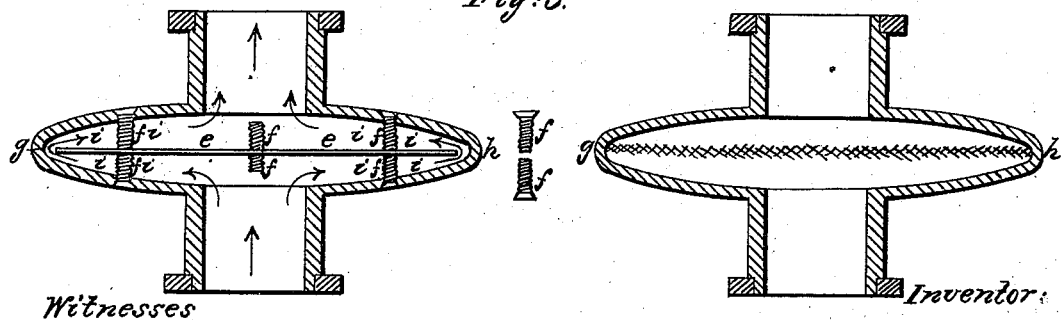
Witnesses
G. F. Myggatt
John K. Moore.
Inventor:
Carter Glidden.

UNITED STATES PATENT OFFICE.

CARLOS GLIDDEN, OF MILWAUKEE, WISCONSIN.

IMPROVEMENT IN HOT-BLAST PIPES.

Specification forming part of Letters Patent No. 46,559, dated February 28, 1865.

*To all whom it may concern:*

Be it known that I, CARLOS GLIDDEN, of the city of Milwaukee, in the State of Wisconsin, have invented a certain new and useful Improvement in Hot-Blast Pipes; and I do hereby declare that the following is a full, clear, and exact description thereof, reference being had to the accompanying drawings, and to the letters and marks thereon.

In passing air through pipes to produce the hot-blast, as now generally used, no means are employed to control or direct the air, which, left in its course through the pipe, becomes irregularly heated, that portion of the air nearest the pipe's surface being heated to the highest degree of any portion, while that portion constituting the interior or middle part of the air in the pipe has its temperature only slightly affected. Some attempts have been made to so direct the air passing through the pipes as to produce the regular and uniform heating of the entire amount of the air. In one of these efforts, and perhaps the nearest successful, a twisted sheet of metal has been placed within the pipe with the intention of giving to the air a circulating motion, so as to bring a greater portion of it in contact with the heated surfaces of the pipes; but this plan has, to a considerable extent, the same objection that exists to the older plan of the free caliber of the pipe, for in both plans there will always be an interior or central portion of the air remote from the heating-surface, and consequently not directly exposed to or in contact with the heated surfaces of the pipes.

My invention looks to the so constructing of the hot-blast pipes as to expose the entire or whole amount of the air to the heating-surfaces, and to give to the air a uniform temperature or degree of heat; and my invention consists in enlarging or widening out at certain points and placing within such enlarged part a plate or its equivalent, so that the entire amount of the air shall pass through such enlarged part in a thin stratum, and thus, being uniformly heated and circulated, move on to the space in the regular track of pipe beyond.

The drawings forming part of this specification show how my invention may be carried out, though the construction here illustrated is not the one I intend as a matter of preference to use, it having been adopted on this occasion mainly with the view of giving an easy explanation of the invention and of showing the position of the plate when used in the expanded portion of the pipe.

The several figures of these drawings show, and by the marks and letters of reference thereon indicate, one section of a pipe with the expanded part or chamber having the deflecting-plate therein. The section is represented as being made of two pieces longitudinally held together by rings surrounding each end of the pipe, and the plate kept in position by screws passing through the shell of the chamber or the expanded portion of the pipe. The track of the air is indicated by the arrows in that figure marked "3, letter C;" and it will be readily seen that the air will, on passing through a pipe constructed as here represented, be very regularly and uniformly exposed to a large and efficient heating-surface. Only one of such sections of pipe are shown by these drawings; but, as is evident, any number of such sections may be used that may be required, each section having appropriate flanges for attachment to the other, and the joints thereof made tight by packing or otherwise, as may be preferred; and the pipes may be placed in a horizontal or vertical or any other desirable position, and may be made of such form or shape as will be best for the special occasion of their use; and, as is also evident, the deflecting-plate may have substituted for it a deflector of spherical or spheroidal form, or any such other form as will best adapt it to the form or shape or position of the chamber or expanded portion of the pipe.

A convenient and excellent way of constructing blast-pipes on my plan, as here set forth, will be to place the plate or deflector in a mold or flask, and then form the core of the pipe around it, using pins or such other means as are commonly used to make the attachment between the plate and the pipe, and thus after the sand of the core is cleaned out leaving the plate or deflector within the chamber. This manner of making the pipe would leave it with joints only at each end having the flanges for connection, and the chamber or expanded portion would be stronger than if the plate was affixed by screws, as the pins or connecting means would act as braces to the chamber.

What I claim as new and of my invention, and desire to secure by Letters Patent, is—

Making hot-blast pipes, substantially as herein set forth.

This specification signed this 22d day of December, 1864.

CARLOS GLIDDEN.

Witnesses:
G. W. MYGATT,
JOHN K. MOORE.